US008696440B2

(12) United States Patent
Curtin

(10) Patent No.: US 8,696,440 B2
(45) **Date of Patent: *Apr. 15, 2014**

(54) METHOD OF GAMING, A GAME CONTROLLER AND A GAMING SYSTEM

(71) Applicant: John Andrews Curtin, Mortdale (AU)

(72) Inventor: John Andrews Curtin, Mortdale (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,182

(22) Filed: Oct. 19, 2012

(65) Prior Publication Data

US 2013/0095908 A1 Apr. 18, 2013

Related U.S. Application Data

(63) Continuation of application No. 12/192,851, filed on Aug. 15, 2008, now Pat. No. 8,317,593.

(30) Foreign Application Priority Data

Jan. 25, 2008 (AU) ................................ 2008900351

(51) Int. Cl.
*A63F 13/00* (2006.01)

(52) U.S. Cl.
USPC ................................................ 463/20; 463/25

(58) Field of Classification Search
USPC .......................................... 463/16, 20, 25, 31
See application file for complete search history.

(56) References Cited

U.S. PATENT DOCUMENTS

| | | | | | |
|---|---|---|---|---|---|
| 4,706,961 | A * | 11/1987 | Singleman et al. | ........... | 273/274 |
| 2006/0258434 | A1* | 11/2006 | Jaffe et al. | ........................ | 463/16 |
| 2007/0155475 | A1* | 7/2007 | Gak | ................................ | 463/20 |
| 2007/0270208 | A1* | 11/2007 | Caspers et al. | .................. | 463/20 |
| 2008/0058062 | A1* | 3/2008 | Okada | ............................ | 463/20 |
| 2008/0058063 | A1* | 3/2008 | Okada | ............................ | 463/20 |
| 2008/0102916 | A1* | 5/2008 | Kovacs et al. | ................... | 463/16 |
| 2008/0182650 | A1* | 7/2008 | Randall et al. | .................. | 463/25 |
| 2009/0104959 | A1* | 4/2009 | Caputo et al. | ................... | 463/16 |
| 2009/0124364 | A1* | 5/2009 | Cuddy et al. | .................... | 463/27 |

* cited by examiner

*Primary Examiner* — Masud Ahmed
(74) *Attorney, Agent, or Firm* — McAndrews, Held & Malloy, Ltd.

(57) ABSTRACT

A method of gaming comprising: selecting a plurality of symbols and displaying the selected symbols at respective ones of a plurality of display positions arranged in a grid having a plurality of display positions arranged between a plurality of pairs of opposing sides, each symbol being selected from a symbol set; determining whether a line of contiguous symbols is formed by one or more designated symbols between a pair of opposing sides of the grid; and making an award in response to a positive determination.

20 Claims, 7 Drawing Sheets

METHOD OF GAMING, A GAME CONTROLLER AND A GAMING SYSTEM

RELATED APPLICATIONS

This application is a continuation of U.S. Pat. No. 8,317,593, having a filing date of Aug. 15, 2008, which claims priority to Australian Provisional Patent Application No. 2008900351, filed Jan. 25, 2008, both of which are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to a method of gaming, a game controller and a gaming system.

Many gaming systems are provided in the form of gaming machines which allow a player to play a game such as a spinning reel type game. In such games prizes are awarded based on particular symbol combinations. It is also known to award prizes by virtue of secondary games such as feature games which are typically provided separately.

While such gaming systems provide users with enjoyment, a need exists for alternative gaming systems in order to maintain or increase player enjoyment.

BRIEF SUMMARY OF THE INVENTION

In a first aspect, the invention provides a method of gaming comprising:

- selecting a plurality of symbols and displaying the selected symbols at respective ones of a plurality of display positions arranged in a grid having a plurality of display positions arranged between a plurality of pairs of opposing sides, each symbol being selected from a symbol set;
- determining whether a line of contiguous symbols is formed by one or more designated symbols between a pair of opposing sides of the grid; and
- making an award in response to a positive determination.

In an embodiment, the symbol set includes a wild symbol and at least two other symbols, the wild symbol adapted to substitute for each of the at least two other symbols.

In an embodiment, the method comprises controlling the selection of wild symbols such that the number of selected wild symbols is proportional to an amount bet.

In an embodiment, the number of selected wild symbols is proportional to an amount bet per line played in a base game.

In an embodiment, one symbol of the set of symbols is a designated symbol and at least one symbol is a blocking symbol which can block completion of a line by the designated symbol.

In an embodiment, there are at least two different designated symbols each of which is able to form a line and each of which can block formation of a line by the other designated symbol.

In an embodiment, the at least two different designated symbols can each only form a line between a different one of the pairs of opposing sides.

In an embodiment, the at least two different designated symbols can each form a line between both of the pairs of opposing sides.

In an embodiment, there are only two other symbols, both of which are designated symbols.

In an embodiment, there are more display positions along a major axis of the grid than along a minor axis of the grid, and forming a line along the major axis results in a larger award than forming a line along the minor axis.

In an embodiment, a line must be parallel to an axis of the grid.

In an embodiment, a base game is displayed in a first display area and the grid is displayed concurrently in a second display area.

In an embodiment, selecting symbols for the grid determines whether a play of the base game is to result in the awarding of a jackpot prize.

In an embodiment, selecting symbols for the grid determines whether a play of the base game can result in the awarding of a jackpot prize.

In an embodiment, the method comprises selecting symbols for the grid for each play of the base game.

In an embodiment, the selection of each symbol other than wild symbols is performed independently for each display position.

In a second aspect, the invention provides a game controller for a gaming system, the game controller arranged to:

- select a plurality of symbols and cause a display to display the selected symbols at respective ones of a plurality of display positions arranged in a grid having a plurality of display positions arranged between a plurality of pairs of opposing sides, each symbol being selected from a symbol set;
- determine whether a line of contiguous symbols is formed by one or more designated symbols between a pair of opposing sides of the grid; and
- make an award to a player in response to a positive determination.

In an embodiment, the symbol set includes a wild symbol and at least two other symbols and the game controller comprises a symbol selector arranged such that selection of each symbol other than any wild symbols is performed independently for each display position.

In an embodiment, the symbol selector is arranged to control the selection of wild symbols such that the number of selected wild symbols is proportional to an amount bet.

In an embodiment, the number of selected wild symbols is proportional to an amount bet per line played in a base game.

In an embodiment, one symbol of the set of symbols is a designated symbol and at least one symbol is a blocking symbol which can block completion of a line by the designated symbol.

In an embodiment, there are at least two different designated symbols each of which is able to form a line and each of which can block formation of a line by the other designated symbol.

In an embodiment, the at least two different designated symbols can each only form a line between a different one of the pairs of opposing sides.

In an embodiment, the at least two different designated symbols can each form a line between both of the pairs of opposing sides.

In an embodiment, there are only two other symbols, both of which are designated symbols.

In an embodiment, there are more display positions along a major axis of the grid than along a minor axis of the grid, and forming a line along the major axis results in a larger award than forming a line along the minor axis.

In an embodiment, a line must be parallel to an axis of the grid.

In an embodiment, the game controller is further arranged to implement a base game and the base game is displayed in a first display area and the grid is displayed concurrently in a second display area.

In an embodiment, selecting symbols for the grid determines whether a play of the base game is to result in the awarding of a jackpot prize.

In an embodiment, selecting symbols for the grid determines whether a play of the base game can result in the awarding of a jackpot prize.

In an embodiment, the game controller is arranged to select symbols for the grid for each play of the base game.

In an embodiment, the game controller is further arranged such that selection of each symbol other than wild symbols is performed independently for each display position.

In an embodiment, the game controller comprises a line evaluator arranged to determine whether a line of contiguous symbols is formed.

In an embodiment, the game controller is constituted, at least in part, by a processor arranged to execute program code stored in a memory.

In a third aspect, the invention provides a gaming system comprising:

one or more displays; and a game controller arranged to:

select a plurality of symbols and display the selected symbols on at least one display at respective ones of a plurality of display positions arranged in a grid having a plurality of display positions arranged between a plurality of pairs of opposing sides, each symbol being selected from a symbol set;

determine whether a line of contiguous symbols is formed by one or more designated symbols between a pair of opposing sides of the grid; and make an award to a player in response to a positive determination.

In an embodiment, the symbol set includes a wild symbol and at least two other symbols and the game controller comprises a symbol selector arranged such that selection of each symbol other than any wild symbols is performed independently for each display position.

In an embodiment, the symbol selector is arranged to control the selection of wild symbols such that the number of selected wild symbols is proportional to an amount bet.

In an embodiment, the number of selected wild symbols is proportional to an amount bet per line played in a base game.

In an embodiment, one symbol of the set of symbols is a designated symbol and at least one symbol is a blocking symbol which can block completion of a line by the designated symbol.

In an embodiment, there are at least two different designated symbols each of which is able to form a line and each of which can block formation of a line by the other designated symbol.

In an embodiment, the at least two different designated symbols can each only form a line between a different one of the pairs of opposing sides.

In an embodiment, the at least two different designated symbols can each form a line between both of the pairs of opposing sides.

In an embodiment, there are only two other symbols, both of which are designated symbols.

In an embodiment, there are more display positions along a major axis of the grid than along a minor axis of the grid, and forming a line along the major axis results in a larger award than forming a line along the minor axis.

In an embodiment, a line must be parallel to an axis of the grid.

In an embodiment, the game controller is further arranged to implement a base game and the base game is displayed in a first display area and the grid is displayed concurrently in a second display area.

In an embodiment, selecting symbols for the grid determines whether a play of the base game is to result in the awarding of a jackpot prize.

In an embodiment, selecting symbols for the grid determines whether a play of the base game can result in the awarding of a jackpot prize.

In an embodiment, the game controller is arranged to select symbols for the grid for each play of the base game.

In an embodiment, the gaming system is further arranged such that selection of each symbol other than wild symbols is performed independently for each display position.

In an embodiment, the game controller comprises a line evaluator arranged to determine whether a line of contiguous symbols is formed.

In an embodiment, the game controller is constituted, at least in part, by a processor arranged to execute program code stored in a memory.

In an embodiment, the gaming system comprises a first display displaying the base game and a second display displaying the grid.

In a fourth aspect, the invention provides computer program code which when executed implements the above method.

In a fifth aspect, the invention provides a computer readable medium comprising the above program code.

In a sixth aspect, the invention provides a data signal comprising the above program code.

In a seventh aspect, the invention provides transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
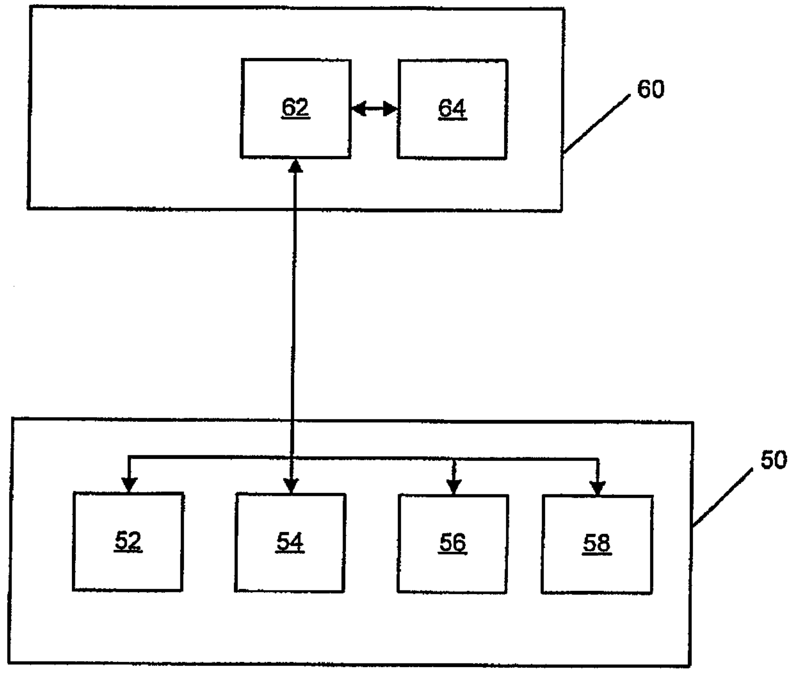
FIG. 1 is a block diagram of the core components of a gaming system.

Referring to the drawings, there is shown a gaming system having a game controller arranged to implement a game where symbols are selected for each position in a grid of display positions, the grid having two pairs of opposing sides. Prizes are awarded if a line is completed between either of the pair of opposing sides.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
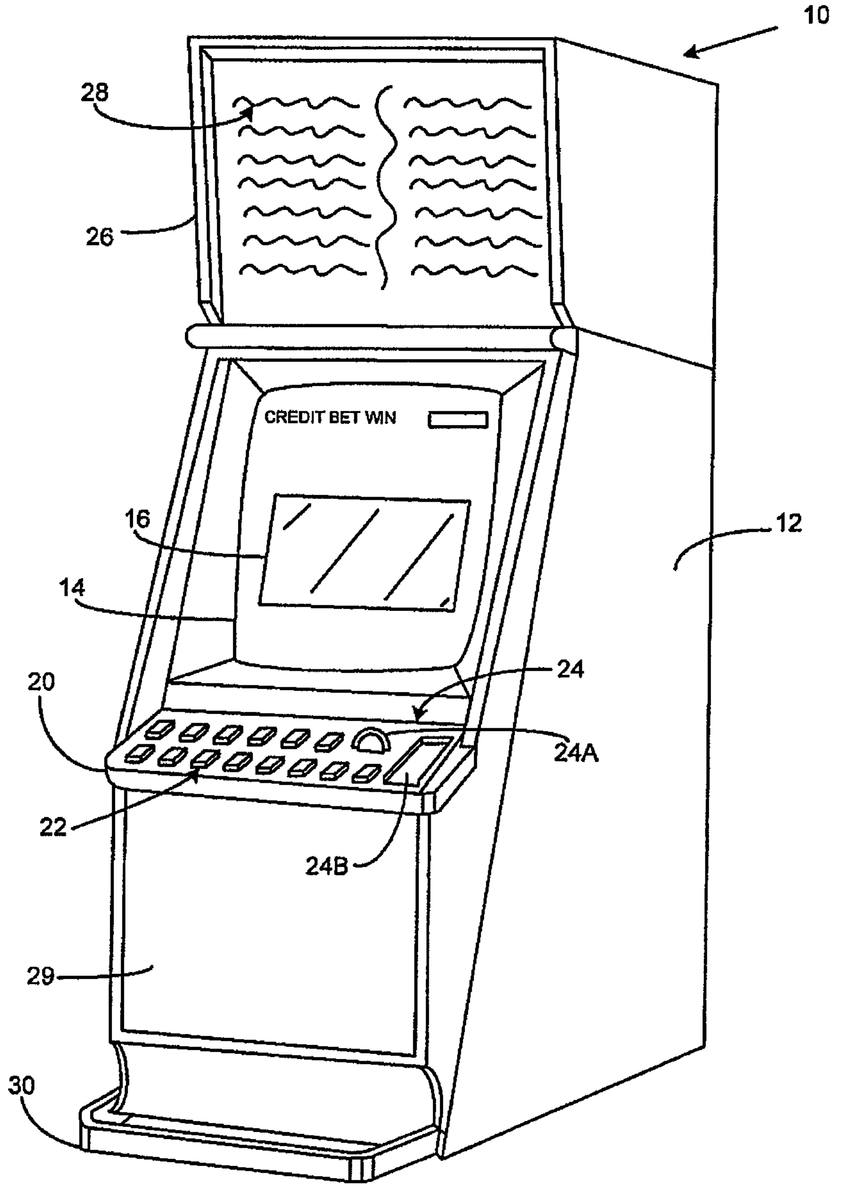
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type. Artwork and/or information, including for example pay tables and details of bonus awards and other information or images relating to the game may be provided on a front panel 29 of the console 12. A coin tray 30 is mounted beneath the front panel 29 for dispensing cash payouts from the gaming machine 10.

Figure 3:
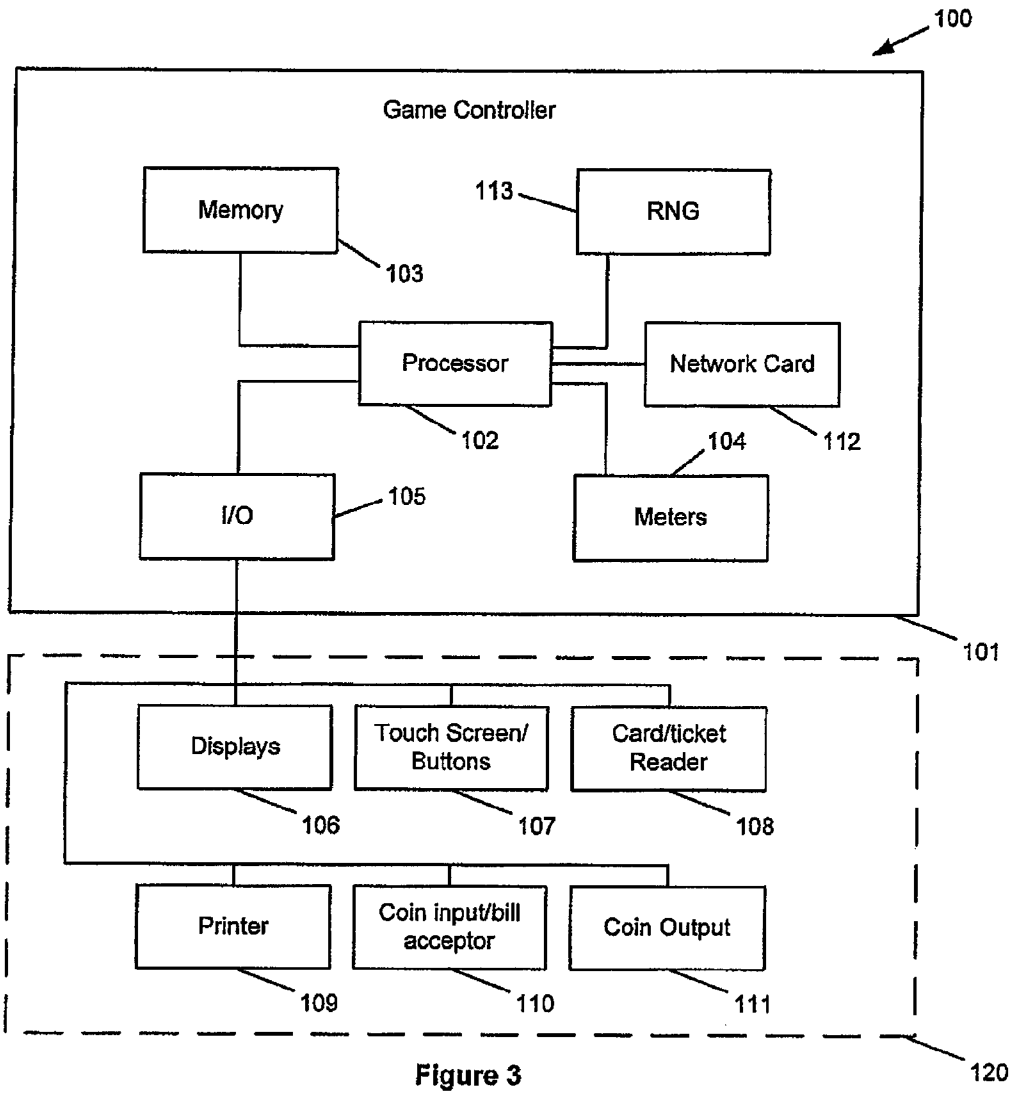
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
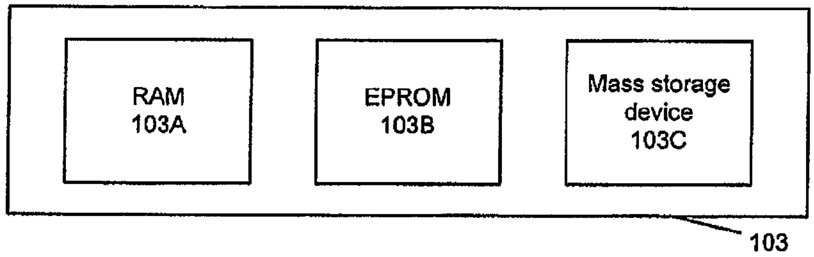
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
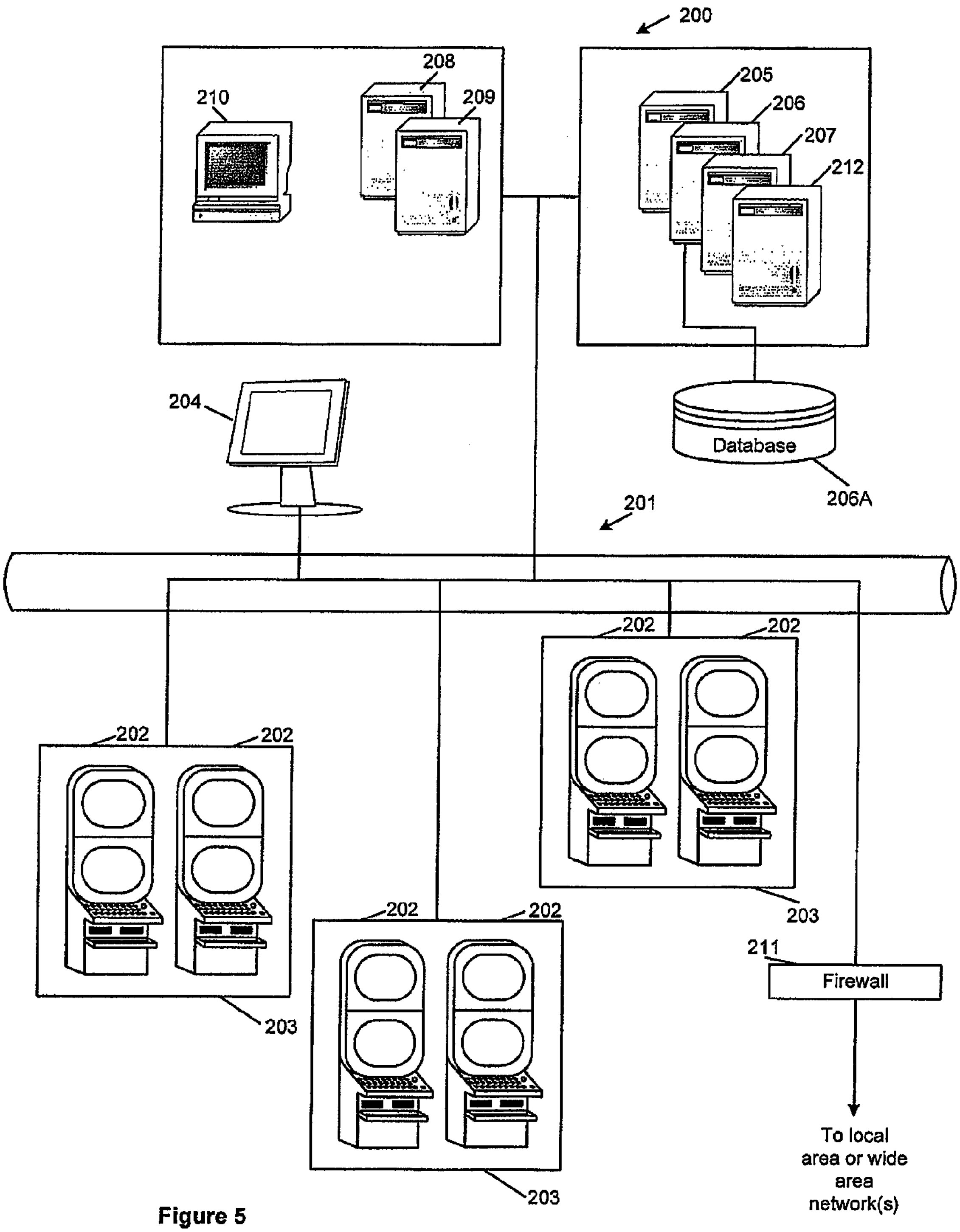
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

In the below embodiment, the gaming system is described as being arranged in a manner to implement the game as a secondary, feature game which runs in a top screen of a top box 26 while, another game, referred to as the base game runs simultaneously in the bottom screen 14. Persons skilled in the art will appreciate the game could also be provided as a feature game triggered from a base game, for example, in response to a particular symbol combination or could be provided as a stand alone game. In the embodiment, where the feature game runs concurrently with the base game, the gaming system effectively provides a dual game round where for each play made by the player, an outcome is generated for each of the base and feature games.

It will also be appreciated that even when provided as a secondary game which runs simultaneously with a base game, separate displays need not necessarily be provided. This is illustrated in the functional block diagram of FIG. 6 which shows a first display area 54A and a second display area 54B as forming part of the one or more displays 54 of the player interface 50 and could be implemented on a single display or two displays. In the embodiment, the secondary game is conducted each time the base game is conducted. However, there need not necessarily be one correspondence between the number of base and secondary games which are conducted.

Figure 6:
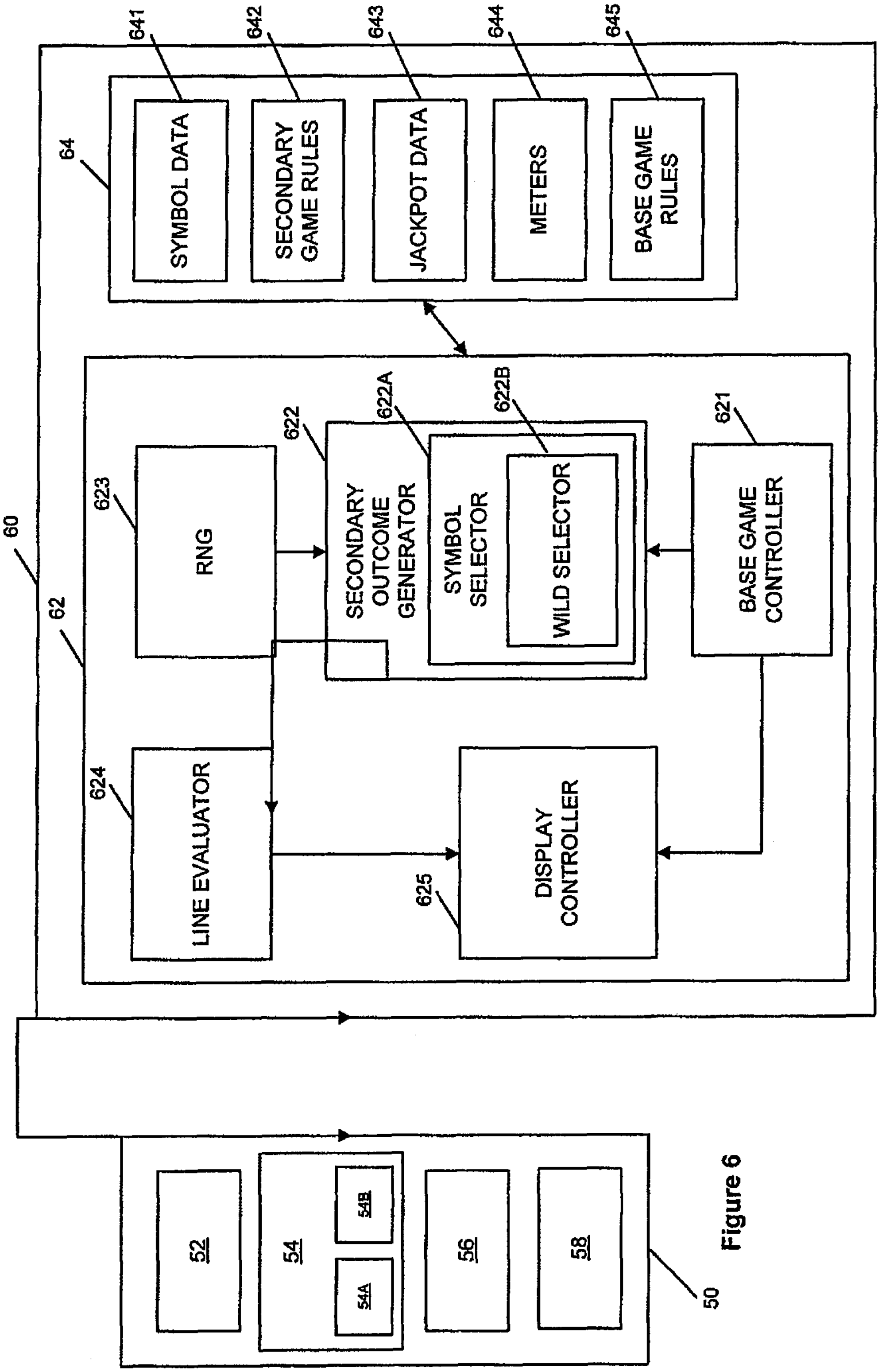
FIG. 6 is a further block diagram of a gaming system.

Referring now to FIG. 6, a player operates credit mechanism 52 to establish a credit on the game controller which is stored as meter data 644. A player than operates game player mechanism 56 to place a bet. The bet which is placed will depend on the nature of the base game and how bets placed in the base game are related to the secondary game. In the embodiment, the player's bet in the base game is used to determine the player's prospects in the secondary games. In an alternative embodiment, the player may place specific bets in base and secondary games.

In the embodiment, the base game is a spinning reel type game where a player selects a number of lines to play which are known as "pay or" "win" lines and an amount to bet per line. These amounts are provided to the base game controller 621 which carries out a base game in accordance with base game rules 645 including determining whether to award the prizes. The base game controller controls the first display area 54A to display the outcome by means of display controller 625 and updates meters 644 to reflect the deduction of credit for the bet and any wins by virtue of the outcome of the base game. The base game controller 621 also advises the secondary outcome generator of the amount bet per line. Persons skilled in the art will appreciate that the secondary outcome generator 622 could also obtain this data in another way, for example by retrieving it from a defined place in memory 64.

Secondary outcome generator 622 implements the secondary game in accordance with secondary game rules 642. In this embodiment, the secondary outcome generator 622 is arranged to determine whether to award a player the current value of the jackpot prize specified by jackpot data 643.

In the embodiment, the secondary game rules 642 specify a grid made up of display positions. One pair of opposed sides of the grid are assigned to a major jackpot prize and the other pair of sides of the grid are assigned to a minor jackpot prize. The number of display positions in the grid can be set in accordance with the requirements of the game designer. In one example, there may be five display positions along one axis and seven display positions along another axis. The longer axis being the one linking the two sides associated with the major jackpot prize such that it is harder to win the major jackpot prize than the minor jackpot prize.

In the embodiment, a wild selector 662B determines how many of the display positions in the grid display positions are to be filled with wild symbols which can substitute for any other symbol, based on the amount bet per line received from the base game controller 621 and the number of wild symbols specified for the amount bet per line in the secondary game rules 642. The wild selector 622B then selects positions for these wild symbols. Depending on the embodiment, grid positions may be filled in accordance with fill rules, for example such that the wild symbols are arranged in designated patterns, selected randomly using values obtained from the random number generator 623 or selected randomly with some constraints, for example, constraints which cause the symbols to be spread across the grid. Thus, it will be appreciated that the selection of positions for the wilds forms part of the symbol selection for the symbols which will be ultimately displayed in the grid. Once the wild symbols have been selected, the symbol selector 622A selects which symbols of the symbol set specified by symbol data 641 will be displayed in the remaining grid positions. In the embodiment, the symbol selector 622A selects which symbol will appear at each display position independently of each other display position. (It will be appreciated that the wild symbols form part of the symbol data 641.) In another embodiment, there may be no wild symbols.

In one example, there may be two different symbols such that each display position of the grid will either have a wild symbol, or one of the two available types of symbols.

In the embodiment, either of the symbols is able to form a line across the grid—i.e. between two opposing sides. That is, one of the symbols in combination with wild symbols may traverse the entire grid.

Accordingly the line evaluator 624 determines based on game rules 642 whether a line has been formed. The nature of a line may vary from embodiment to embodiment. In some embodiments it will need to be a straight line along one on the horizontal or vertical axis. In another embodiment, a line may be formed by a set of contiguous symbols from one or more horizontal or vertical lines. If the line evaluator 624 determines that a line has been formed in accordance with game rules 642 it makes an award of the minor or major jackpot specified by jackpot data 643 depending on which sides the line joins. Thus, an award may be made of either of the jackpot prizes. In another embodiment, the award is an eligibility to the jackpot such that it is awarded if another condition is met by the base game, for example, if a specific symbol combination occurs concurrently in the base game.

It will be appreciated that the secondary outcome will be displayed under control of the display controller 625 in second display area 54B. The display may be enhanced by highlighting any completed line or indeed by highlighting the nearest to completed line. In this embodiment, the secondary, feature game thus falls under the broad category of second screen feature games.

Persons skilled in the art will appreciate that a number of variations may be made to the above embodiment, for example additional symbols could be added to award different prizes or to trigger different features.

In an alternative embodiment, symbols of one type may act to form lines while symbols of another type act to block lines. In another embodiment, one symbol may be assigned to each jackpot such that only symbols of one type can complete a horizontal axis line and symbols of another type can complete vertical axis lines such that the lines act to block each other. In some embodiments it may be possible for both jackpots to be awarded simultaneously. In others, such is that described above where one symbol is allocated to each jackpot, only one jackpot can ever be awarded at once. In another embodiment, only lines completed between a specific pair of sides result in an award. In a variation of such an embodiment, a rotation or a random determination may be made to determine which pair of sides is active at any time.

In an alternative embodiment, the grid is formed by a hexagon having three pairs of opposing sides. Other grids could also be employed.

Figure 7:
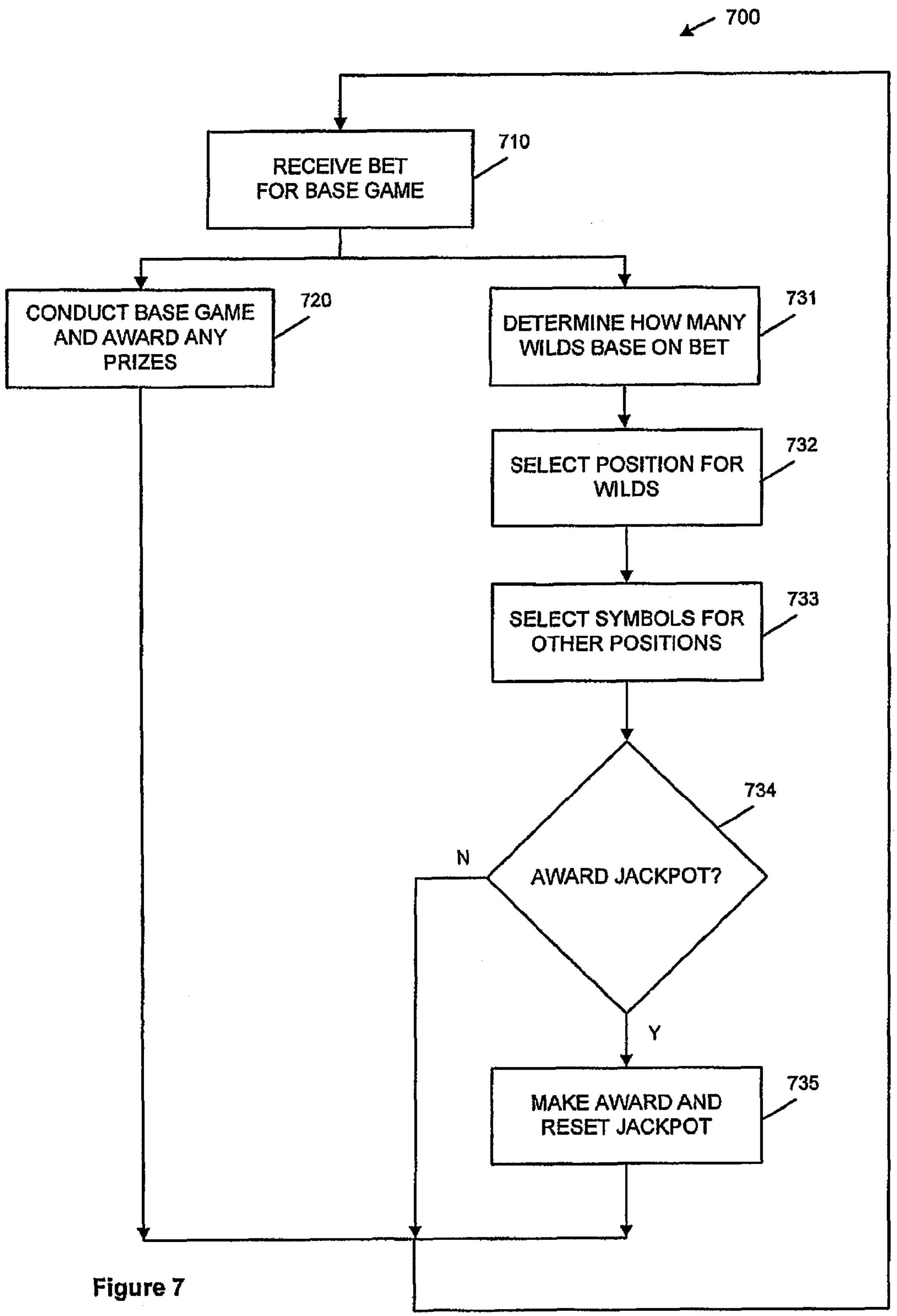
FIG. 7 is a flow chart of an embodiment.

The method 700 is summarized in FIG. 7. A bet is received for a base game 710 and the base game is conducted based on the bet and any prizes are awarded 720. Concurrently the method involves determining how many wilds should be added 731 to the grid based on the amount bet. Positions are selected for the wilds 732 and symbols are selected for the other positions 733 such that symbols are selected for all of the display positions. It is then determined 734 whether a line has been completed and hence whether a jackpot should be awarded. If a jackpot is not awarded the method proceeds to the next game otherwise a jackpot award is made and the jackpot is reset 735.

Persons skilled in the art will appreciate that the embodiment could be used with other base games, for example, rather than a spinning reel type base game, the base game could be a poker game, another card game, a dice game, a ball draw game, a pin and ball game or the like.

Example

Figure 8:
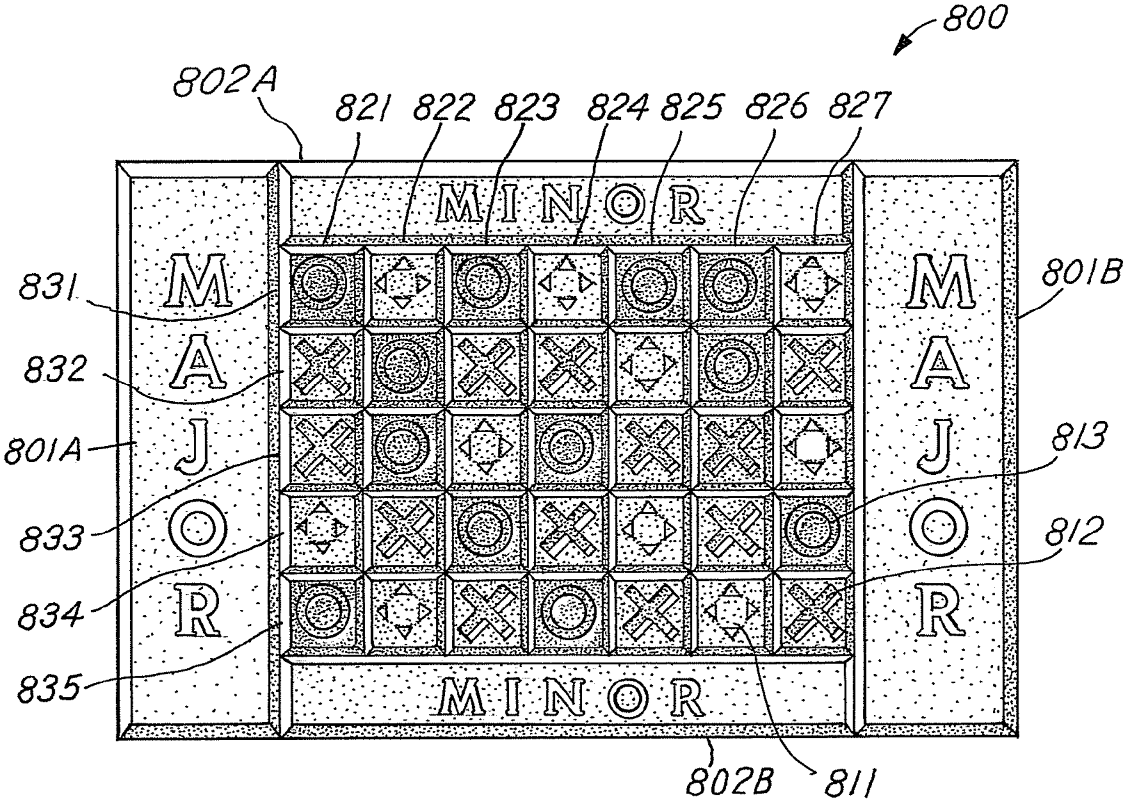
FIG. 8 shows a display of an example.

Referring to FIG. 8, there is shown in exemplary display 800 of a grid formed by five rows 831 to 835 and seven columns 821 to 827 such that there are thirty five display positions in total in the display 800. Completing a line along the vertical axis is assigned to a minor jackpot such that the upper and lower opposing sides 802A, 802B are displayed as being related to the minor jackpot and the left and right opposing sides 801A, 801B are displayed as relating to the major jackpot. In this example, a jackpot is awarded if a straight line is completed vertically or horizontally. That is if one row 831 to 835 or one column 821 to 827 is completed by the same symbol including substitution by a wild symbols.

It will be seen in FIG. 8 that there are three types of symbols, a wild symbol 811, a cross symbol 812 and a nought symbol 813 such that the game is styled after the game of noughts and crosses or "tic-tac-toe". In the exemplary grid 800 of FIG. 8, ten wild symbols have been placed in the grid at random locations in proportion to the amount bet per line in the base game. For example, either one wild per credit per line bet in the base game or two wilds per credit would work with the examples of a ten credit bet or a five credit bet respectively. The remaining display positions are filled randomly. It will be seen that the symbols take the form of tiles. The tiles can be displayed as either flipping or spinning each time a new game is conducted. It will be seen that in this example, row 831 has been completed by noughts and wild symbols and accordingly that a major jackpot will be awarded. All the symbols in row 831 would be lit up in order to indicate awarding of a prize. Persons skilled in the art will appreciate that many other symbols could be used.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by transmitting it from a server to a gaming machine).

It will be understood to persons skilled in the art of the invention that many modifications may be made without departing from the spirit and scope of the invention. In particular, features of the above example and embodiments can be employed to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming system having a game controller arranged to:

determine, based on a wagered amount in a base game, whether one or more wild symbols are to be added to a grid of a secondary game;

select a position to display the one or more wild symbols, if any, in the grid;

select a position for each of a plurality of game symbols in the grid, the plurality of game symbols including at least a plurality of a first symbol type and a plurality of a second symbol type, each of the selected plurality of game symbols being positioned in one of a plurality of display positions of the grid that is not occupied by one of the one or more wild symbols; and determine whether a first line connects a first pair of opposing sides of the grid, the first line being formed by a contiguous plurality of the first symbol type, either alone or in combination with one or more of the one or more wild symbols, the first line not being allowed to extend into a display position of the plurality of display positions that is occupied by the second symbol type.

2. The gaming system of claim 1, wherein the game controller is further arranged to randomly position the at least one wild symbol in one or more of the plurality of display positions.

3. The gaming system of claim 2, wherein the game controller is further arranged to determine an award in response to a determination that the first line connects the first pair of opposing sides.

4. The gaming system of claim 1, further including a second pair of opposing sides, and wherein the game controller is further configured to determine whether a second line formed by a contiguous plurality of the second symbol type, either alone or in combination with one or more of the one or more wild symbols, connects the second pair of opposing sides, the second line not being extendable into a display position of the plurality of display positions that is occupied by the first symbol type.

5. The gaming system of claim 4, wherein the game controller is further arranged to determine an award in response to a determination that the second line connects the second pair of opposing sides.

6. The gaming system of claim 5, wherein an award is not awarded for a line of contiguous symbols of the second symbol type, either alone or in combination with one or more of the one or more wild symbols, that connects the first pair of opposing sides, and wherein an award is not awarded for a line of contiguous symbols of the first symbol type, either alone or in combination with one or more of the one or more wild symbols, that connects the second pair of opposing sides.

7. The gaming system of claim 5, wherein the first pair of opposing sides is separated by a larger quantity of the plurality of display positions than the second pair of opposing sides, and wherein the award in response to the determination that the first line connects the first pair of opposing sides is greater than the award in response to the determination that the second line connects the second pair of opposing sides.

8. The gaming system of claim 1, further including a second pair of opposing sides and a third pair of opposing sides.

9. A gaming system having a game controller arranged to:

determine, based on play of a base game, a quantity of at least one wild symbol to add to a grid for play of a secondary game, the grid including a first pair of opposing sides and plurality of display positions, the first pair of opposing sides being separated from each other by at least a portion of the plurality of display positions;

display on at least one display the at least one wild symbol in the grid;

select a plurality of second game symbols, the plurality of second game symbols including at least a plurality of a first symbol type and a plurality of a second symbol type;

display the selected plurality of second game symbols on the at least one display, each of the selected plurality of second game symbols being displayed in a display position of the plurality of display positions that is not occupied by the at least one wild symbol; and determine whether a first line of contiguous symbols comprising a plurality of first symbol types, either alone or in combination with at least one of the at least one wild symbol, connects the first pair of opposing sides, the first line not being extendable into a display position of the plurality of display positions that is displaying the second symbol type.

10. The gaming system of claim 9, wherein the game controller is further arranged to randomly position the at least one wild symbol in one or more of the plurality of display positions.

11. The gaming system of claim 10, wherein the game controller is further arranged to determine an award in response to a determination that the first line connects the first pair of opposing sides.

12. The gaming system of claim 9, further including a second pair of opposing sides, and wherein the game controller is further configured to determine whether a second line formed by a plurality of the second symbol type, either alone or in combination with one or more of the at least one wild symbol, connects the second pair of opposing sides, the second line not being extendable into a display position of the plurality of display positions that is displaying the first symbol type.

13. The gaming system of claim 12, wherein the game controller is further arranged to determine an award in response to a determination that the second line connects the second pair of opposing sides.

14. The gaming system of claim 13, wherein a prize is not awarded for a line of contiguous symbols of the second symbol type, either alone or a combination with one or more of the at least one wild symbol, that connects the first pair of opposing sides.

15. The gaming system of claim 14, wherein the first pair of opposing sides is separated by a larger quantity of the plurality of display positions than the second pair of opposing sides, and wherein the award in response to the determination that the first line connects the first pair of opposing sides is greater than the award in response to the determination that the second line connects the second pair of opposing sides.

16. The gaming system of claim 9, further including a second pair of opposing sides and a third pair of opposing sides.

17. A gaming system comprising:

at least one display;

a game controller, the game controller configured to:

select a plurality of base game symbols for display on the at least one display during play of a base game;

determine, based on an amount wagered in the base game, whether to add one or more wild symbols to a grid for a secondary game, the secondary game being a type of game that is different than the base game;

determine and display on the at least one display the location of each of the one or more wild symbols in one or more of a plurality of display positions of the grid;

select and display on the at least one display a plurality of second game symbols for the secondary game, each of the second game symbols being displayed in one of the plurality of display positions that is not occupied by the one or more wild symbols, the plurality of secondary game symbols including at least a plurality of a first symbol type and a plurality of a second symbol type;

award an award for a first line that connects a first pair of opposing sides of the grid, the first line formed by a contiguous plurality of first symbol types, either alone or in combination with at least one of the one or more wild symbols, the first line not being permitted to extend into the plurality of display positions that display the second symbol type.

18. The gaming system of claim 17, wherein the second symbol type is designated to block the extension of lines formed by other symbol types of the plurality of symbols.

19. The gaming system of claim 17, wherein the grid further includes a second pair of opposing sides, the game controller being configured to award and award for a second line that connects the second pair of opposing sides, the second line formed by a contiguous plurality of first symbol types, either alone or in combination with one or more of the one or more wild symbols.

20. The gaming system of claim 19, wherein the first pair of opposing sides is separated by a quantity of the plurality of display positions that is larger than a quantity of the plurality of display positions that separates the second pair of opposing sides, and wherein the award awarded for the first line connecting the first pair of opposing sides is larger than the award awarded for the second line connecting the second pair of opposing sides.

* * * * *